United States Patent Office 3,666,558
Patented May 30, 1972

3,666,558
COFFEE VENDOR
Harry H. Pryor, St. Louis, William H. Short, St. Louis County, and William V. Koeneker, St. Louis, Mo., assignors to UMC Industries, Inc., St. Louis, Mo.
Filed Sept. 10, 1970, Ser. No. 71,075
Int. Cl. A47j 31/00
U.S. Cl. 134—1
23 Claims

ABSTRACT OF THE DISCLOSURE

A coffee vendor having a brewer for brewing fresh coffee from ground coffee and a cleaning system providing for delivery of a charge of hot water and a cleaning agent to the brewer and retaining the charge in the brewer, followed by two rinses of the brewer each involving delivery of a charge of hot water to the brewer and retaining this charge for a rinse interval, and having either an ultrasonic transducer or a mechanical system for pulsating these charges in the brewer for better cleaning, pulsation also being applicable to the charge of hot water in the brewer during brewing for better brewing of coffee.

BACKGROUND OF THE INVENTION

This invention relates to coffee vendors, more particularly to a coffee vendor of the single-cup fresh brew type having a brewer in which a cup of coffee is brewed from ground coffee in the brewer on each vend cycle.

Reference may be made to the coassigned U.S. Pat. 3,446,137, issued May 27, 1969, entitled Hot Beverage Merchandizer, for a disclosure of a coffee vendor of the single-cup fresh brew type to which the present invention is particularly applicable. For brewing good coffee, the brewer (and the delivery line for brewed coffee) of such a vendor should be thoroughly cleaned at frequent intervals. Reference is also made to the coassigned U.S. Pat. 3,390,626, issued July 2, 1968, entitled Coffee Vendor with Cleaning System, for a disclosure of a cleaning system for such a vendor which effects cleaning of the brewer simply by pushing a button, with the cleaning cycle involving delivery of a charge of hot water and cleaning agent to the brewer, retention of this charge in the brewer for a cleaning interval, followed by rinsing. This system has generally been quite satisfactory, but in some instances (depending at least in part upon the surface tension of the cleaning charge) air may be entrapped in the brewer at the filter screen thereof and interfere with thorough cleaning of the screen.

SUMMARY OF THE INVENTION

Accordingly, among the several objects of this invention may be noted the provision of an improved method of an apparatus for cleaning the brewer, including thorough cleaning of the filter screen in the brewer; and the provision of such a method and apparatus involving pulsation of liquid in the brewer, with the apparatus capable of pulsating hot water in the brewer during a brew cycle as well as pulsating a charge of hot water and a cleaning agent and charges of hot water for rinsing during a cleaning cycle. Other objects and features will be in part apparent and in part pointed out hereinafter.

DESCRIPTION OF THE PREFERRED EMBODIMENTS

Figure 1:
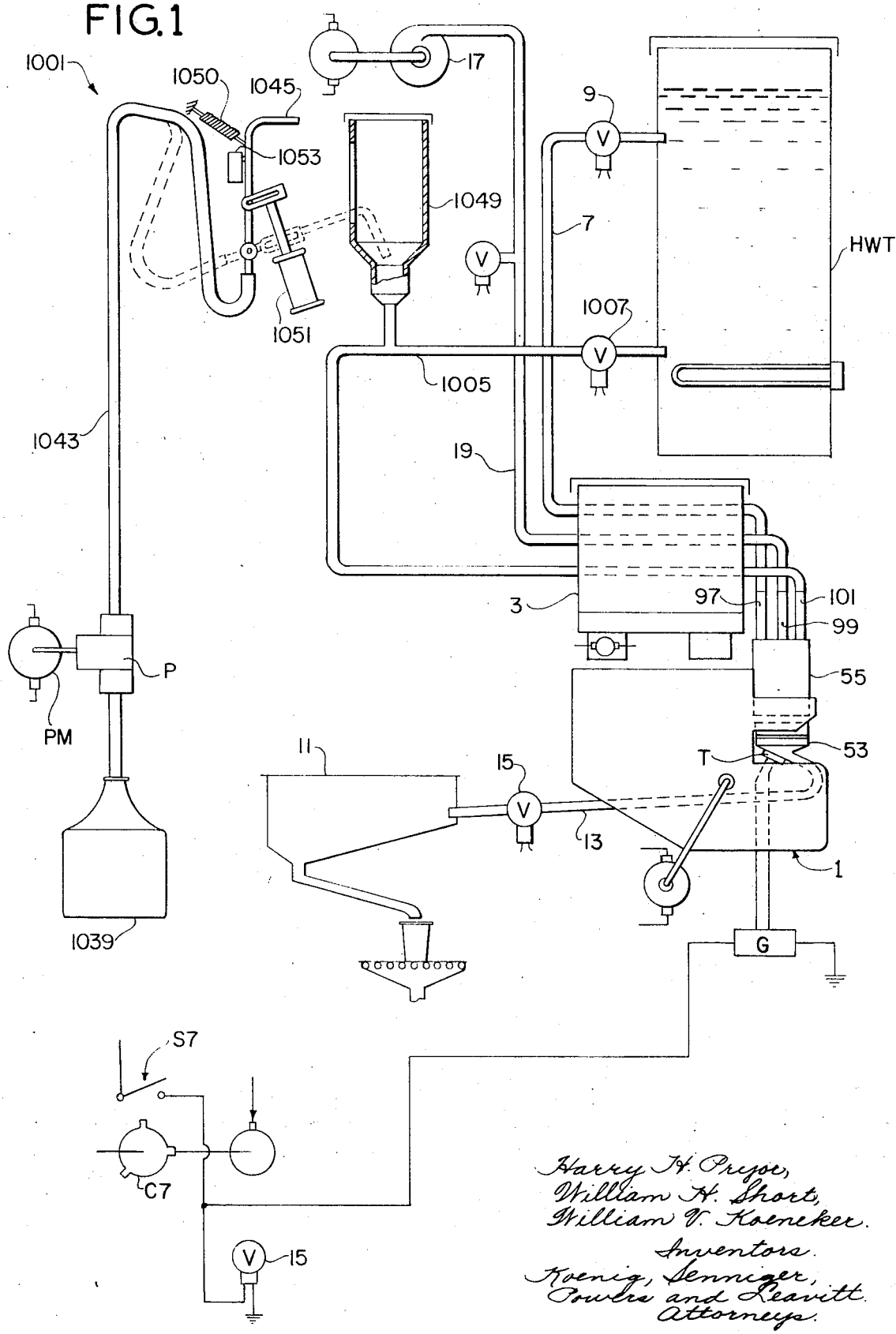
FIG. 1 is a diagrammatic view showing a coffee vendor equipped with a cleaning system of this invention.

Referring to the drawings, first more particularly to FIG. 1, there is indicated at 1 a brewer which, as herein illustrated, is of the same construction as the brewer 1 shown in the aforesaid U.S. Pat. 3,446,137. The brewer is adapted to receive a charge (a "throw") of ground coffee from a ground coffee dispenser 3 and also to receive a measured quantity of hot water (a cup of hot water) from a hot water tank HWT for brewing a cup of coffee. The hot water is delivered to the brewer from the tank via a hot water delivery line 7 which has a solenoid valve 9 therein adapted, when energized, to open the line for delivery of water. Brewed coffee is delivered from the brewer to a mixing bowl 11 via a delivery line 13 having a solenoid valve 15 therein adapted to be closed during brewing of coffee in the brewer and to open after brewing has been concluded for flow of the brewed coffee through line 13 to the mixing bowl. An air compressor 17 is provided for delivering compressed air via a line 19 to the brewer to force brewed coffee from the brewer through line 13 to the mixing bowl 11 (valve 15 being opened for this purpose).

Figure 2:
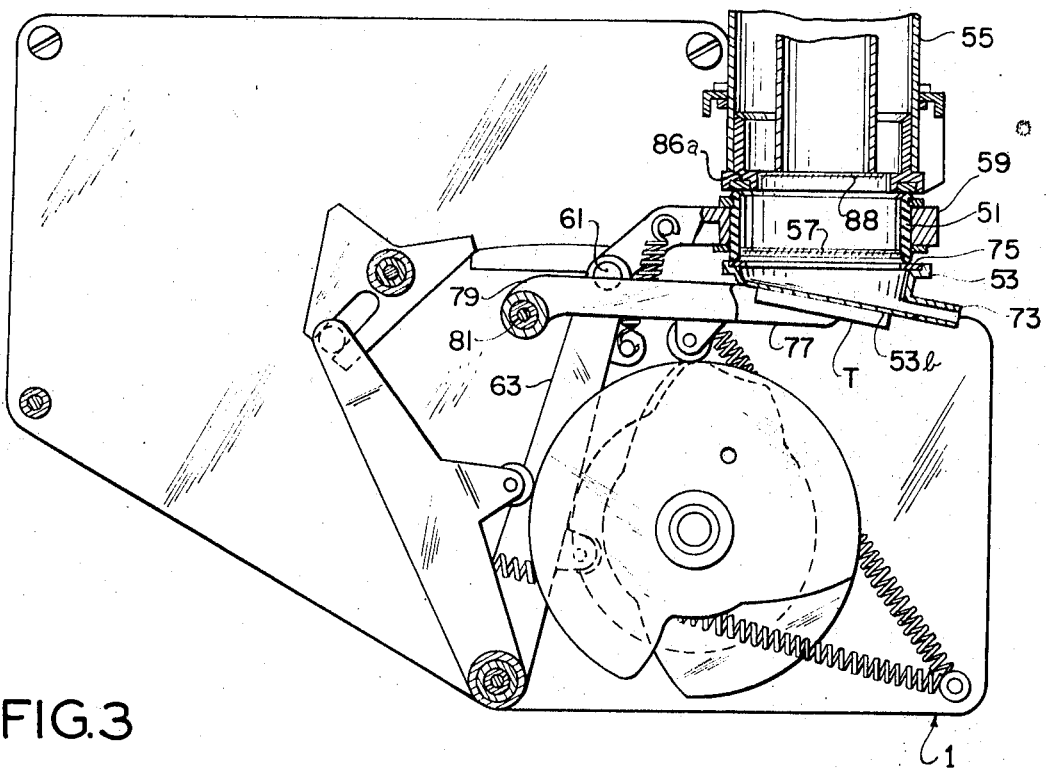
FIG. 2 is a view partly in side elevation and partly in vertical section of the brewer of the vendor.

The brewer 1 (see FIG. 2) comprises a cup 51 which holds the charge of ground coffee, a bottom closure or head 53 for the cup, and a brew vessel 55 above the cup. The cup 51 is of shallow cylindrical form with a filter screen 57 at its bottom (for straining the brewed coffee). It is secured at the free end of an arm 59 pivoted at 61 on the upper end of a shifter level 63. The bottom closure 53 is in the form of a funnel having an inclined bottom wall 53b with an outlet 73, and is provided at its rim with a gasket 75 for sealing engagement with the bottom of the cup 51. This bottom head or funnel 53 is adapted for up-and-down movement, being mounted between a pair of arms 77 of a lever 79 pivoted on a shaft 81. The funnel 53 is frictionally pivoted between arms 77. The vessel 55 is in the form of an inverted cylindrical cup, open at the bottom, and is adapted to hold in conjunction with cup 51 somewhat more than a cup of hot water. The vessel 55 has a screen 88 (of larger mesh than screen 57) at its lower end, and its bottom rim has a gasket 86a adapted for sealing engagement by the upper end of cup 51 when the latter is raised by the funnel 53. The vessel 55 has a check-valved hot water inlet 97 at the top to which is connected the hot water delivery line 7. It also has a port 99 at the top to which is connected the air line 19 from the air compressor 17, and a check-valved hot water inlet 101 at the top for connection of a hot water line of a cleaning and sanitizing system.

The vendor as above described is identical to that shown in U.S. Pat. 3,446,137, the parts as so far described bearing the same reference numerals as used in said patent. Reference may also be made to said patent for full details of the vendor, including the details as to the mechanisms for operating the funnel 53 and the cup 51 and the circuitry therefor. It should suffice here to state that in the normal operation of the vendor, at the start of a cycle, the funnel 53 and cup 51 occupy a home position in which the funnel is partially raised and engaging the cup with the cup partially raised but somewhat below the bottom of the brew vessel 55, the cup holding a charge of ground coffee (previously delivered thereto from dispenser 3 toward the conclusion of the previous brew cycle). After deposit of coin and actuation of one of a number of selector switches (not shown herein, but fully shown in 3,446,137), the funnel 53 is raised and clamps the cup 51 against the bottom rim of vessel 55. Valve 9 is opened for flow of a cup of hot water to vessel 55. The hot water is held in the cup 51 and vessel 55 for a brew interval to brew a cup of coffee, after which valve 15 is opened and air compressor 17 operated to force the brewed coffee through the screen 57 and out through the outlet 73 of funnel 53 and line 13 to the mixing bowl 11 and thence to a cup C. Funnel 53 is then swung down, and cup 51 is withdrawn from between the vessel 55 and the funnel and flipped over to dump the spent coffee grounds. Then the cup 51 is swung back, loaded with a charge of ground coffee and moved into position between vessel 55 and funnel 53. Reference may be made to said U.S. Pat. 3,446,137 for full details.

As herein illustrated, the vendor is equipped with a cleaning and sanitizing system indicated generally at 1001, and which may be of the type disclosed in the aforesaid U.S. Pat. 3,390,626. Thus, this system is shown as comprising a hot water line 1005 including a solenoid valve 1007 extending from the hot water tank HWT to the hot water inlet 101 of the brew vessel 55. At 1039 is shown a container for a concentrated liquid cleaning agent, any of various cleaning agents conventionally used for cleaning coffee makers being suitable. A pump P, such as a conventional vacuum pump driven by an electric motor PM is provided for pumping cleaning agent from container 1039 via a line 1043 to a nozzle 1045. This nozzle is pivoted so as to be movable between a delivery position such as shown in dotted lines in FIG. 1 for delivering the cleaning agent into a funnel 1049 connected into line 1005 between the valve 1007 and the brewer 1, and a retracted position withdrawn from the funnel as shown in solid lines in FIG. 1, for breaking communication to the brewer. A spring 1050 biases the nozzle to its retracted position and a solenoid 1051 is provided for swinging the nozzle down to its delivery position on energization of the solenoid. A switch 1053 is positioned for actuation by the nozzle when retracted.

The cleaning and sanitizing system as above described is identical to that shown in U.S. Pat. 3,390,626, the parts thereof as above described bearing the reference numerals as used in said patent plus one thousand. Reference may be made to said patent for full details of the system, including the circuitry therefor. It should suffice here to state that, in the normal operation of the cleaning and sanitizing system, following the closure of a manual start switch (57 in 3,390,626), and with the cup 51 clamped between the vessel 55 and the funnel 53, solenoid 1051 is energized to swing nozzle 1045 down into funnel 1049. Pump motor PM is energized to drive pump P to deliver cleaning agent from container 1039 through line 1043 and nozzle 1045 into the funnel 1049 which in turn delivers the cleaning agent into line 1005 for flow to the brewer 1. Valve 15 is closed so as to hold the cleaning agent (and hot water to be subsequently delivered) in the brewer. The pump P is stopped and valve 1007 is opened for delivery of hot water to the brewer, where it mixes with the cleaning agent to constitute a charge of a cleaning solution. Valve 15 is closed and the cleaning solution charge is held in the brewer for a cleaning interval, then valve 15 is opened for drainage of the cleaning solution from the brewer and then closed. Valve 1007 is again opened to deliver hot water to the brewer for a first rinse, the rinse water being held in the brewer by closing valve 15 for a first rinse interval, and then dumped by opening valve 15, followed by a second similar rinse.

In accordance with this invention, the funnel 53 is made of sheet metal, e.g., stainless steel and its bottom wall is relatively thin-walled, e.g., made of 22 gauge sheet. Secured to the bottom of the bottom wall of the funnel is an ultrasonic transducer T adapted when energized via an alternating current to transmit ultrasonic energy through the bottom wall of the funnel 53 into the liquid in the brewer 1 to effect pulsation of the liquid. At G is indicated a conventional generator for generating high frequency electrical energy (e.g., at a frequency of 50–60 khz.) connected to deliver this high frequency electrical energy to the transducer T, which, as will be readily understood, converts the electrical energy to ultrasonic energy which is transmitted through the bottom wall of the funnel 53 to the liquid in the brewer.

In accordance with this invention, the transducer T is energized by the generator G during the cleaning interval in which the charge of hot water and the cleaning agent is retained in the brewer 1 to pulsate this charge via transmission of ultrasonic energy from the transducer through the thin bottom wall of the funnel 53 to the said charge in the brewer. The pulsation is in an up and down direction and hence in opposite directions through the screen 57 (and also the upper screen 88) for thoroughly cleaning the screen 57 by the cavitation effect of the hot water with the cleaning agent therein on the screen, including cleaning the interstices as well as the faces of the screen. For this purpose, the generator may be connected, for example, in parallel in the electrical circuitry with the valve 15 as shown in FIG. 1. Valve 15 is the same as the valve designated 11 in 3,390,626, controlled by a switch S7 which is in turn controlled by a programmer cam C7. Thus, when valve 15 is energized and closed during the cleaning cycle to hold the cleaning solution in the brewer for the cleaning interval and to hold rinse water in the brewer for the rinse intervals, the generator is energized to energize the transducer.

The generator is also energized to energize the transducer when valve 15 is energized and closed during a brew cycle (3,446,137 gives full details of this), so that the hot water in the brewer for brewing coffee is pulsated, which may assist in extraction of solubles from the ground coffee for better brewing.

Figure 3:
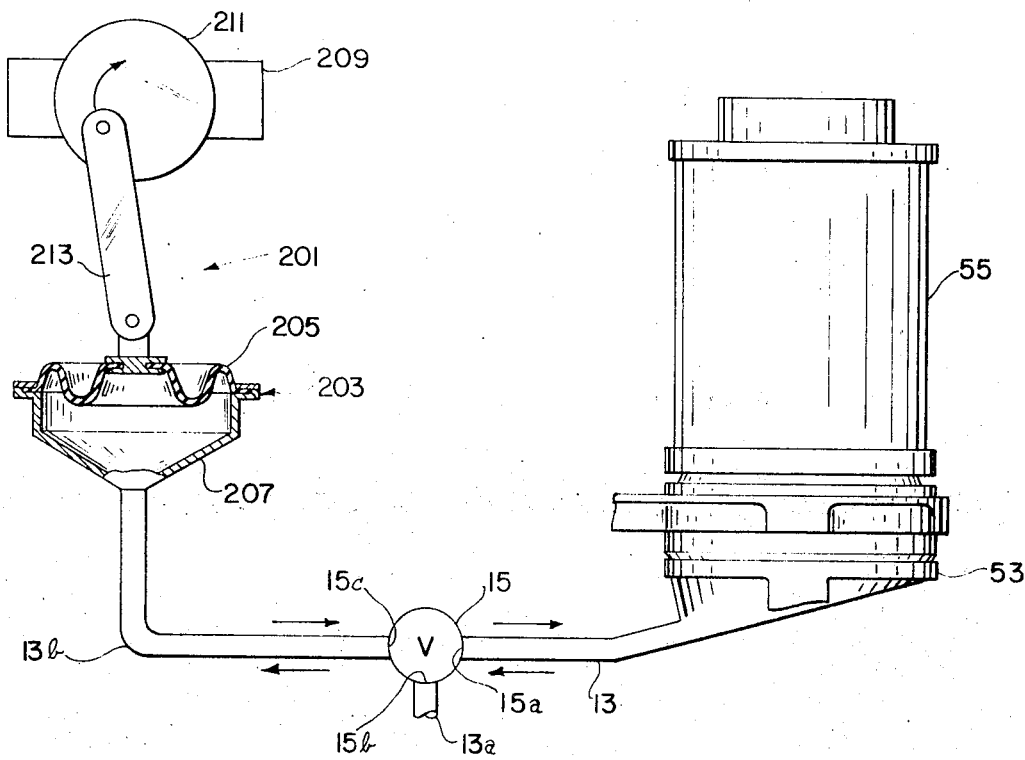
FIG. 3 is a view showing a modification.

FIG. 3 shows a modification in which pulsation of the charge in the brewer is effected mechanically instead of ultrasonically. As shown therein, valve 15 is a three-way valve having a port at 15a to which is connected line 13 from the brewer funnel 53, a port 15b from which extends line 13a to the mixing bowl 11 and a port 15c from which extends line 13b to a mechanical pulsating means generally designated 201. When valve 15 is deenergized, ports 15a, 15b and 15c are connected. When valve 15 is energized, ports 15a and 15c are connected for communication between the pulsating means and the brewer and port 15b is blocked. The pulsating means 201 is shown as comprising a diaphragm motor 203 constituted by a diaphragm 205 closing the upper end of a chamber or cup 207, with a motor 209 driving a crank disk 211 connected by a link 213 to the diaphragm. Line 13b connects ports 15c of valve 15 and the cup 207. Motor 209 may be connected (like generator G) in parallel with valve 15. Thus, when valve 15 is energized, the motor is energized and actuates the diaphragm 205 to pulsate liquid in the brewer 1, noting that the brewer and cup 207 are then in communication via lines 13 and 13b with ports 15a and 15c in communication and port 15b blocked.

Figure 4:
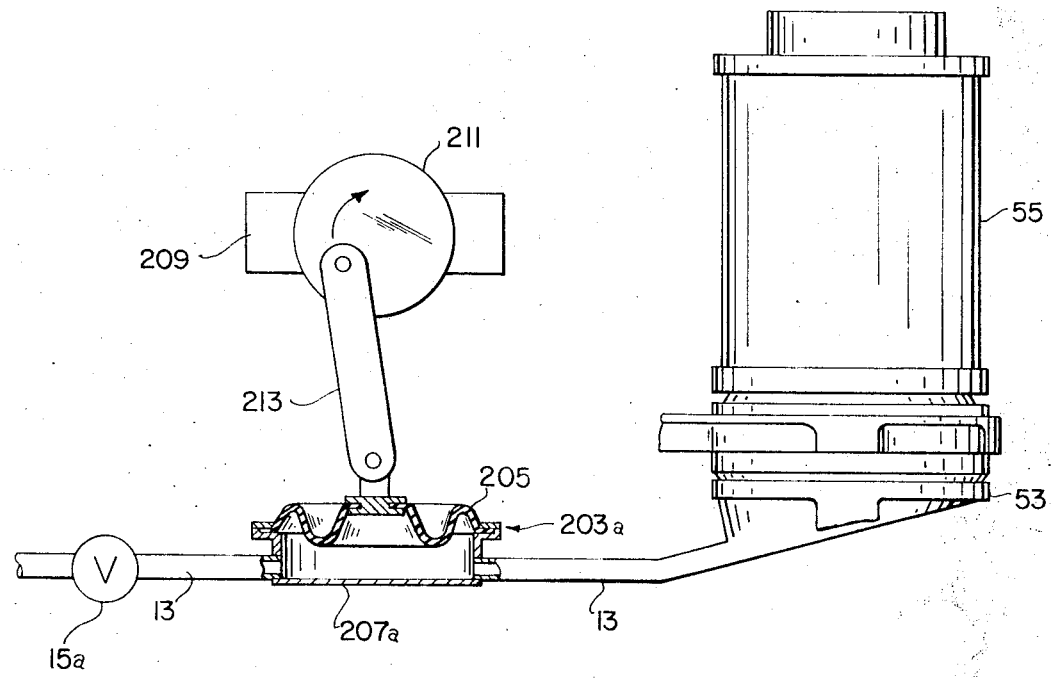
FIG. 4 is a view showing another modification.
Corresponding reference characters indicate corresponding parts throughout the several view of the drawings.

FIG. 4 shows a further modification in which a modified diaphragm motor 203a has its chamber 207a connected in line 13 between the brewer funnel 13 and a valve 15a for simply opening and closing line 13. When valve 15a is deenergized, it is open for flow through line 13. When energized, it blocks line 13 downstream from the motor 203a so that liquid is held in line 13 and the chamber 207a of the motor. The diaphragm of the motor 203a is again designated 205, and is again shown as driven by motor 209 via crank disk 211 and link 213. Motor 209 here may be connected in parallel with valve 15a. Thus, when valve 15a is energized, motor 209 is energized and actuates the diaphragm to pulsate liquid in the chamber 207a and hence to pulsate liquid in the brewer via the direct communication between the chamber and the brewer (the liquid being held in both the chamber and the brewer by the valve 15a which is closed when energized).

In the systems shown in FIGS. 3 and 4, the liquid may be pulsated by means of a reciprocating plunger or piston as an equivalent to the diaphragm.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. The method of cleaning the brewer of a coffee vendor, said brewer having a screen for staining the brewed coffee, comprising delivering a charge of hot water and a cleaning agent to the brewer, retaining the charge in the brewer for a cleaning interval, pulsating the charge in the brewer in opposite directions through the screen during the cleaning interval, draining off the charge, and rinsing the brewer.

2. The method of claim 1 wherein the rinsing step comprises at least one rinse involving delivering a charge of hot water to the brewer for the rinse, retaining this rinse charge in the brewer for a rinse interval, pulsating said rinse charge in opposite directions through the screen during said rinse interval, and draining off said rinse charge.

3. The method of cleaning the brewer of a coffee vendor comprising delivering a charge of hot water and a cleaning agent to the brewer, retaining the charge in the brewer for a cleaning interval, pulsating the charge in the brewer during the cleaning interval, draining off the charge, and using the brewer, wherein the charge is pulsed by transmitting ultrasonic energy thereto.

4. The method of claim 3 wherein the ultrasonic energy is transmitted to the charge through a wall of the brewer.

5. The method of claim 3 wherein the rinsing step comprises at least one rinse involving delivering a charge of hot water to the brewer for the rinse, retaining this rinse charge in the brewer for a rinse interval, pulsing said rinse charge by transmitting ultrasonic energy thereto, and draining off the rinse charge.

6. The method of claim 3 for cleaning a brewer which has a screen for straining the brewed coffee wherein the charge is pulsed by transmitting the ultrasonic energy thereto below the screen at the bottom of the brewer.

7. The method of claim 6 wherein the rinsing step comprises at least one rinse involving delivering a charge of hot water to the brewer for the rinse, retaining this rinse charge in the brewer for a rinse interval, and pulsing the rinse charge by transmitting ultrasonic energy thereto below the screen at the bottom of the brewer.

8. A coffee vendor having a brewer adapted to be supplied with hot water and ground coffee from respective sources thereof for brewing coffee therein, said brewer including a screen for straing the brewed coffee, and means connected to the brewer for effecting pulsation of liquid in the brewer in opposite directions through the screen.

9. A coffee vendor as set forth in claim 8 having means for charging said brewer with hot water and a cleaning agent for a cleaning interval, means for delivering hot water to said brewer for at least one rinse following the cleaning interval, and means for actuating said pulsation means during the cleaning interval and the rinse.

10. A coffee vendor as set forth in claim 8 having means for actuating said pulsation means during the brewing of coffee in the brewer.

11. A coffee vendor as set forth in claim 10 having means for charging said brewer with hot water and a cleaning agent for a cleaning interval, means for delivering hot water to said brewer for at least one rinse following the cleaning interval, and means for actuating said pulsation means during the cleaning interval and the rinse.

12. A coffee vendor as set forth in claim 8 wherein said pulsation means comprises a chamber for liquid connected to the brewer and means for mechanically pulsating the liquid in said chamber.

13. A coffee vendor as set forth in claim 12 wherein the brewer has a line extending therefrom for delivery of liquid from the brewer, with a valve in said line for opening and closing it, said chamber being connected to said line between the brewer and said valve.

14. A coffee vendor as set forth in claim 13 wherein said chamber is the chamber of a diaphragm motor and the pulsating means is the diaphragm of the motor.

15. A coffee vendor as set forth in claim 13 having means for charging said brewer with hot water and a cleaning agent for a cleaning interval, means for delivering hot water to the brewer for at least one rinse following the cleaning interval, and means for actuating said mechanical pulsating means with said valve closed during the cleaning interval and the rinse.

16. A coffee vendor having a brewer adapted to be supplied with hot water and ground coffee from respective sources thereof for brewing coffee therein, said brewer including a screen for straining the brewed coffee, and means connected to the brewer for effecting pulsation of liquid in the brewer, wherein said pulsation means comprises an ultrasonic transducer mounted on the brewer for ultrasonically effecting pulsation of liquid in the brewer.

17. A coffee vendor as set forth in claim 16 wherein said transducer is attached to the brewer in such position as to pulsate the liquid in the direction through the screen.

18. A coffee vendor as set forth in claim 16 having means for energizing said transducer during the brewing of coffee in the brewer.

19. A coffee maker as set forth in claim 18 having means for charging said brewer with hot water and a cleaning agent for a cleaning interval, means for delivering hot water to said brewer for at least one rinse following the cleaning interval, and means for energizing said transducer during the cleaning interval and the rinse.

20. A coffee vendor as set forth in claim 16 wherein said brewer comprises a brew vessel for receiving a measured quantity of hot water for brewing a corresponding quantity of coffee, a brew cup having a screen at the bottom of thereof for holding a charge of ground coffee, a bottom head engageable with the bottom of the cup for holding it in engagement with the bottom of the vessel, said head having a relatively thin-walled bottom and an outlet, and said transducer is mounted on the outside of said thin-walled bottom of said head.

21. A coffee vendor as set forth in claim 20 having means for charging said brewer with hot water and a cleaning agent for a cleaning interval, means for delivering hot water to said brewer for at least one rinse following the cleaning interval, and means for actuating said pulsation means during the cleaning interval and the rinse.

22. A coffee vendor as set forth in claim 20 having means for actuating said pulsation means during the brewing of coffee in the brewer.

23. A coffee vendor as set forth in claim 22 having means for charging said brewer with hot water and a cleaning agent for a cleaning interval, means for delivering hot water to said brewer for at least one rinse following the cleaning interval, and means for actuating said pulsation means during the cleaning interval and the rinse.

References Cited

UNITED STATES PATENTS

| 3,092,011 | 6/1963 | Gee | 99—287 |
| 3,171,344 | 3/1965 | Mathieu | 99—287 |
| 3,390,626 | 7/1968 | Holstein | 99—289 |
| 3,446,137 | 5/1969 | Pryor | 99—289 |

ROBERT W. JENKINS, Primary Examiner

U.S. Cl. X.R.

99—287